(12) United States Patent
Koeppel et al.

(10) Patent No.: US 12,224,597 B2
(45) Date of Patent: Feb. 11, 2025

(54) TRANSACTION DEVICE CAPABLE OF MANAGING AND ROUTING POWER FROM AN EXTERNAL POWER SOURCE

(71) Applicant: Capital One Services, LLC, McLean, VA (US)

(72) Inventors: Adam Koeppel, Washington, DC (US); Tyler Locke, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/487,372

(22) Filed: Oct. 16, 2023

(65) Prior Publication Data

US 2024/0063660 A1    Feb. 22, 2024

Related U.S. Application Data

(63) Continuation of application No. 17/303,413, filed on May 28, 2021, now Pat. No. 11,817,715, which is a
(Continued)

(51) Int. Cl.
*H02J 50/10* (2016.01)
*H04B 5/72* (2024.01)
(Continued)

(52) U.S. Cl.
CPC ............. *H02J 50/10* (2016.02); *H04B 5/72* (2024.01); *H04B 5/77* (2024.01); *H04B 5/79* (2024.01);
(Continued)

(58) Field of Classification Search
CPC ........... H04W 4/80; H04W 12/47; H04B 5/79
See application file for complete search history.

(56) References Cited

U.S. PATENT DOCUMENTS

| 10,122,419 B1 | 11/2018 | Koeppel et al. |
| 10,536,193 B2 | 1/2020 | Koeppel et al. |

(Continued)

FOREIGN PATENT DOCUMENTS

| CN | 103391602 A | 11/2013 |
| TW | 201019628 A | 5/2010 |

OTHER PUBLICATIONS

Extended European Search Report for Application No. EP19157979.6, mailed on Jun. 3, 2019, 12 pages.
(Continued)

*Primary Examiner* — Wen W Huang
(74) *Attorney, Agent, or Firm* — Harrity & Harrity, LLP (57) ABSTRACT

A transaction device may include a power reception component configured to receive power from an external device with which the transaction device is to interact to perform a transaction. The transaction device may include a secure element configured to perform the transaction using the power received from the external device. The transaction device may include one or more peripheral components configured to perform one or more operations other than the transaction. The transaction device may include a power management component configured to determine at least one operation, of the one or more operations, to be performed in association with the transaction, and to route power received from the external device to at least one peripheral component, of the one or more peripheral components, capable of performing the at least one operation.

20 Claims, 4 Drawing Sheets

Related U.S. Application Data continuation of application No. 16/718,568, filed on Dec. 18, 2019, now Pat. No. 11,031,816, which is a continuation of application No. 16/156,594, filed on Oct. 10, 2018, now Pat. No. 10,536,193, which is a continuation of application No. 15/904,048, filed on Feb. 23, 2018, now Pat. No. 10,122,419.

(51) Int. Cl.
| | | |
|---|---|---|
| H04B 5/77 | (2024.01) | |
| H04B 5/79 | (2024.01) | |
| H04L 9/40 | (2022.01) | |
| H04W 4/80 | (2018.01) | |
| H04W 12/06 | (2021.01) | |
| H04W 12/08 | (2021.01) | |
| H04W 12/47 | (2021.01) | |

(52) U.S. Cl.
CPC ............ *H04W 4/80* (2018.02); *H04W 12/08* (2013.01); *H04W 12/47* (2021.01); *H04L 63/101* (2013.01); *H04W 12/068* (2021.01)

(56) References Cited

U.S. PATENT DOCUMENTS

| | | | |
|---|---|---|---|
| 11,031,816 | B2 | 6/2021 | Koeppel et al. |
| 2010/0039234 | A1* | 2/2010 | Soliven ................. H04B 5/48 340/10.1 |
| 2010/0048255 | A1 | 2/2010 | Jojivet et al. |
| 2012/0197453 | A1 | 8/2012 | Pugh et al. |
| 2012/0315843 | A1 | 12/2012 | Cox |
| 2013/0005245 | A1* | 1/2013 | Royston ............ H04W 52/0264 455/41.1 |
| 2013/0005247 | A1* | 1/2013 | Awad ................ H04W 52/0296 455/41.1 |
| 2013/0137367 | A1 | 5/2013 | Fisher |
| 2013/0301497 | A1 | 11/2013 | Gonikberg et al. |
| 2014/0103869 | A1 | 4/2014 | Radovic et al. |
| 2014/0256252 | A1 | 9/2014 | Geslin et al. |
| 2015/0065037 | A1* | 3/2015 | Burrell ..................... H04B 5/79 455/41.1 |
| 2015/0121499 | A1 | 4/2015 | Suwald et al. |
| 2016/0066130 | A1 | 3/2016 | Bosua et al. |
| 2016/0249157 | A1 | 8/2016 | Fine et al. |
| 2016/0275480 | A1 | 9/2016 | Sanaboyina et al. |
| 2017/0048729 | A1 | 2/2017 | Jin et al. |
| 2017/0236125 | A1 | 8/2017 | Guise et al. |
| 2018/0241435 | A1 | 8/2018 | Kurz |
| 2018/0262891 | A1* | 9/2018 | Wu ..................... H04W 12/065 |
| 2018/0316815 | A1* | 11/2018 | Douthat ................ G06F 1/28 |
| 2021/0288525 | A1 | 9/2021 | Koeppel et al. |

OTHER PUBLICATIONS

Extended European Search Report for Application No. EP22159450.0, mailed on Oct. 10, 2022, 13 pages.

* cited by examiner

FIG. 4

TRANSACTION DEVICE CAPABLE OF MANAGING AND ROUTING POWER FROM AN EXTERNAL POWER SOURCE

RELATED APPLICATIONS

This application is a continuation of U.S. patent application Ser. No. 17/303,413, filed May 28, 2021, which is a continuation of U.S. patent application Ser. No. 16/718,568, filed Dec. 18, 2019 (now U.S. Pat. No. 11,031,816), which is a continuation of U.S. patent application Ser. No. 16/156,594, filed Oct. 10, 2018 (now U.S. Pat. No. 10,536,193), which is a continuation of U.S. patent application Ser. No. 15/904,048, filed Feb. 23, 2018 (now U.S. Pat. No. 10,122,419), which are incorporated herein by reference.

BACKGROUND

Near field communication (NFC) may refer to a set of communication protocols that enable two devices to establish communication by bringing the devices within close proximity (e.g., 4 cm) of one another. NFC devices may be used in contactless payment systems, in social networking, for sharing contacts, photos, videos, files, and/or the like.

SUMMARY

According to some possible implementations, a transaction device may include a power reception component configured to receive power from an external device with which the transaction device is to interact to perform a transaction. The transaction device may include a secure element configured to perform the transaction using the power received from the external device. The transaction device may include one or more peripheral components configured to perform one or more operations other than the transaction. The transaction device may include a power management component configured to determine at least one operation, of the one or more operations, to be performed in association with the transaction, and to route power received from the external device to at least one peripheral component, of the one or more peripheral components, capable of performing the at least one operation.

According to some possible implementations, a method may include receiving, by a transaction device, power from an external device with which the transaction device is to communicate to perform a transaction; performing, by the transaction device, the transaction using the power received from the external device; determining, by the transaction device, one or more operations to be performed in connection with the transaction, where the one or more operations are different from the transaction; routing, by the transaction device, the power received from the external device to one or more peripheral components of the transaction device based on the one or more operations to be performed; and performing, by the transaction device, at least one operation of the one or more operations using the one or more peripheral components.

According to some possible implementations, an apparatus may include one or more memories and one or more processors, communicatively coupled to the one or more memories, to: receive power from an external device with which the apparatus is to communicate to perform a transaction; perform the transaction using the power received from the external device, where the transaction is performed by communicating with the external device; determine one or more operations, different from the transaction, to be performed in association with the transaction; route the power received from the external device to one or more peripheral components of the apparatus based on performing the transaction; and perform at least one operation of the one or more operations using the one or more peripheral components.

DETAILED DESCRIPTION

The following detailed description of example implementations refers to the accompanying drawings. The same reference numbers in different drawings may identify the same or similar elements.

A transaction device (e.g., a transaction card, a mobile device, a wearable device, and/or the like) may be capable of performing one or more operations other than a transaction (e.g., a financial transaction, an access transaction to grant access to a secure area, and/or the like). For example, the transaction device may communicate with another device (e.g., a smartphone), may output information via a display, a light-emitting diode (LED), a speaker, and/or the like, may store energy for future operations, and/or the like. The transaction device may need power to perform these operations, but may not have an internal power supply. In this case, the transaction device may obtain power from an external device, such as a transaction terminal. However, the external device may only supply enough power to perform the transaction, and may not supply additional power to perform other operations. Furthermore, the transaction device may not be capable of routing power, obtained from the external device, to appropriate components of the transaction device to perform the operations.

Some implementations described herein permit a transaction device to appropriately route power, obtained from an external device, to peripheral components that perform operations other than a transaction performed via the external device (e.g., a financial transaction, an access transaction, and/or the like). Furthermore, some implementations described herein permit the transaction device to obtain additional power from the external device to power such operations. In some implementations, the power may be obtained wirelessly from the external device (e.g., via an NFC antenna). In this case, the amount of power drawn from the external device for performing a transaction may be limited, and the transaction device may obtain additional power to perform the operations other than the transaction. In this way, the transaction device may operate without a wired connection. Furthermore, functionality of the transaction device may be enhanced without requiring an internal power source.

Figure 1:
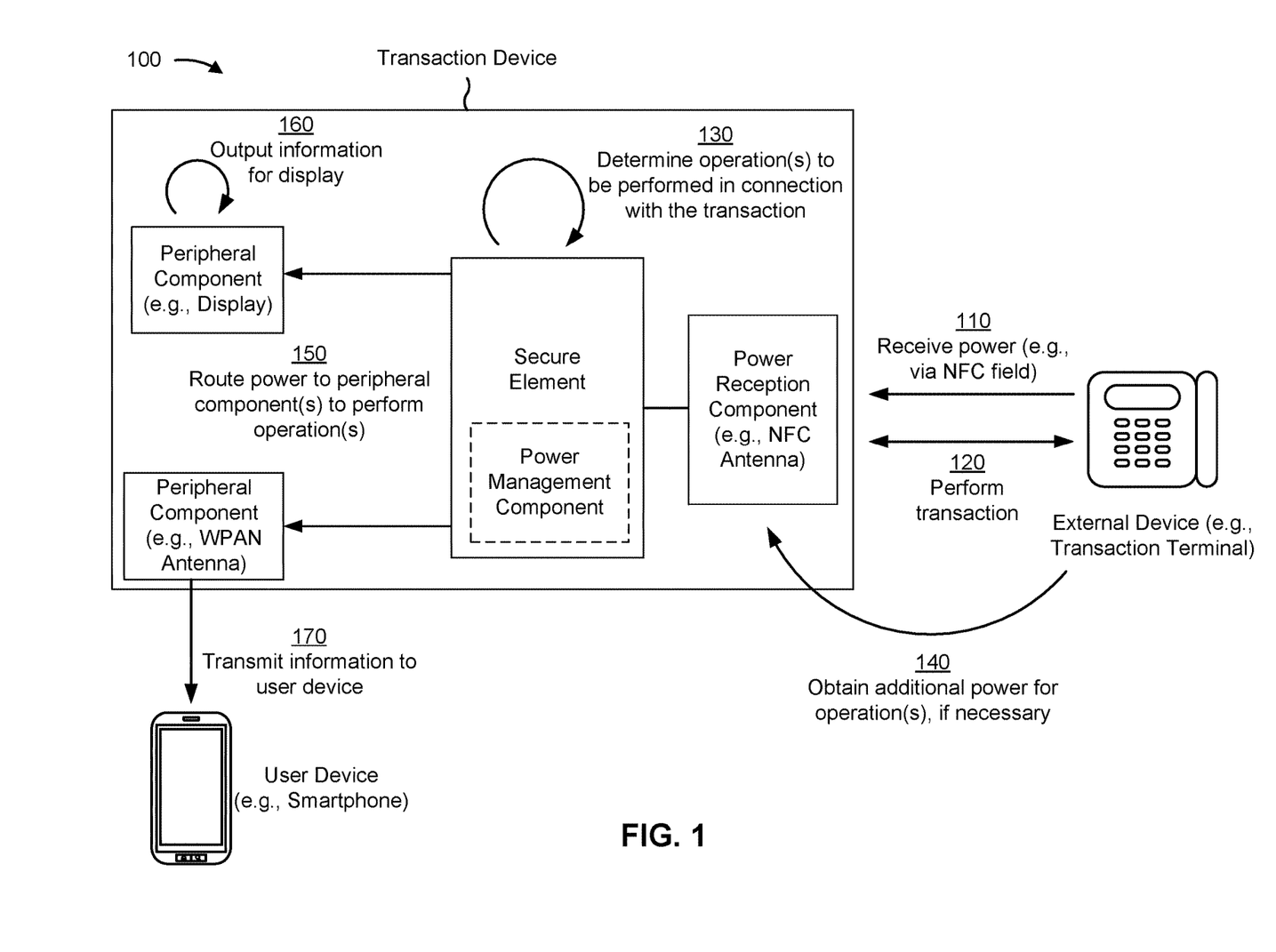
FIG. 1 is a diagram of an overview of an example implementation described herein.

FIG. 1 is a diagram of an overview of an example implementation 100 described herein. As shown in FIG. 1, a transaction device (e.g., a transaction card, a mobile device, a wearable device, and/or the like) may include a power reception component (e.g., an NFC antenna), a secure element, a power management component (e.g., which may be included in the secure element or separate from the secure element), and a set of peripheral components, shown as a display and a wireless personal area network (WPAN) antenna, as an example. The transaction device may communicate with an external device (e.g., a transaction terminal, a point-of-sale device, and/or the like) to perform a transaction. For example, the external device may receive information from the transaction device (e.g., payment information, identification information, an access credential, and/or the like), and may interact with one or more other devices (e.g., a financial transaction backend, an access door, a turnstile, and/or the like) to complete the transaction.

As shown by reference number 110, the transaction device may receive power from the external device, such as via the power reception component. For example, the power reception component may be an NFC antenna, and may receive power via an NFC field generated by the external device. As shown by reference number 120, the transaction device (e.g., the secure element) may interact with the external device to perform the transaction using the power received from the external device.

As shown by reference number 130, the transaction device (e.g., the secure element, the power management component, and/or the like) may identify one or more operations, other than the transaction, to be performed in connection with the transaction. The one or more operations may be performed by one or more peripheral components included in the transaction device. As an example, an operation may include presentation of information on a display of the transaction device. The information may include information associated with the transaction, such as an indication that the transaction was successfully completed, an indication that the transaction failed, an indication of a reason that the transaction failed, an indication of a monetary amount processed in the transaction, an indication of a good or a service paid for in the transaction, information received from the external device, and/or the like. Additionally, or alternatively, an operation may include output of an audio indication via a speaker, output of a visual indication via a light-emitting diode, and/or output of another detectable indication via another output component of the transaction device. The indication may indicate information associated with the transaction, as described above.

Additionally, or alternatively, an operation may include transmission or reception of information via a WPAN communication component of the transaction device. For example, the WPAN communication component may transmit information associated with the transaction (e.g., as described above) to a user device (e.g., a smartphone). In some implementations, the user device and the transaction device may be owned by, carried by, or associated with the same user. In some implementations, the transmitted information may be output for presentation on a display of the user device. Additionally, or alternatively, the information may be used to update an application executing on the user device, such as a virtual wallet, a banking application, and/or the like.

Additionally, or alternatively, an operation may include storage of energy in an energy storage component (e.g., a battery, a capacitor, and/or the like) of the transaction device, which may be a peripheral component of the transaction device. For example, the energy storage component may store energy so that one or more operations and/or transactions may be performed at a later time using the stored energy (e.g., if an external power source is unavailable to power an operation and/or a transaction).

As shown by reference number 140, if the transaction device needs additional power to perform the one or more operations (e.g., after accounting for the power used to perform the transaction), then the transaction device may obtain the additional power from the external device. In some implementations, the transaction device may determine (e.g., using the power management component) whether an amount of power available after performing the transaction satisfies a threshold, and may selectively obtain additional power from the external device based on determining whether the amount of power satisfies the threshold. The threshold may be determined based on the one or more operations to be performed. For example, different operations may require different amounts of power to be performed, and the threshold may represent an amount of power required to perform a particular operation or a particular combination of operations. In some implementations, the transaction device may determine, after performing the transaction, an amount of available power for the one or more operations. In some implementations, the transaction device may estimate, before completing the transaction (e.g., before initiating the transaction or while performing the transaction), an amount of power that will be available after the transaction is completed.

In some implementations, the transaction device may initially obtain more power than is necessary to perform the transaction, and/or may store power in an energy storage component, and this power may be available to perform the one or more operations. If the available power satisfies the threshold, then the transaction device may not obtain additional power from the external device, and may use the available power to perform the one or more operations. If the available power does not satisfy the threshold, then the transaction device may obtain the additional power from the external device, and may use the additional power (and/or some power previously obtained and/or stored by the transaction device) to perform the one or more operations.

In some implementations, the transaction device may determine an amount of power required to perform the one or more operations, and may obtain at least the required amount of power (e.g., may obtain an amount of power greater than or equal to the required amount of power). In some implementations, the transaction device may obtain power from the external device by continuing to draw power from the external device after the transaction has completed, by drawing an amount power that is greater than the amount required to perform the transaction, and/or the like. Additionally, or alternatively, the transaction device may obtain additional power from the external device by transmitting a request, to the external device, for the additional power. In some implementations, the request may indicate an amount of power required to permit performance of the one or more operations, and the external device may supply the required amount of power to the transaction device. Additionally, or alternatively, the request may indicate an amount of time that the external device is to supply additional power, and the external device may supply power to the transaction device for the indicated amount of time. In this way, the transaction device may ensure that there is sufficient power to perform the one or more operations.

In some implementations, the transaction device may select a subset of the one or more operations to be performed. For example, if an amount of power required to perform multiple operations is greater than or equal to a threshold, then the transaction device may prioritize the multiple operations, and may perform a subset of the operations based on the prioritization. In some implementations, the external device may be configured to limit an amount of power supplied to the transaction device and/or an amount of time that the transaction device is permitted to draw power from the external device (e.g., to speed up a transaction, to reduce an amount of time that a user spends at the external device, and/or the like). In this case, the external device may reject a request for additional power (e.g., because the power would take too long to be drawn) and/or may indicate, to the transaction device, an amount of power permitted to be drawn, a time limit for drawing power, and/or the like. Additionally, or alternatively, the transaction device may be configured with a limit on the amount of power permitted to be drawn by the transaction device and/or an amount of time that the transaction device is permitted to draw power from the external device (e.g., based on a user configuration, which may be input via a user device, when the user wants to limit a length of time for performing a transaction).

Based on receiving a rejection of a request for additional power, receiving an indication of an amount of power permitted to be drawn and/or an indication of a time limit for drawing power, and/or a configuration of the transaction device, as described above, the transaction device may identify and/or prioritize a subset of the operations to be performed. In some implementations, the transaction device may determine an updated amount of power required to perform the subset of operations, and may obtain the updated amount of power from the external device, as described elsewhere herein.

As an example, the transaction device may determine that an amount of power available after performing the transaction satisfies a first threshold but does not satisfy a second threshold. If the transaction device is not permitted to obtain additional power from the external device, then the transaction device may route power to a first peripheral component based on determining that the amount of power satisfies the first threshold, and may prevent power from being routed to a second peripheral component based on determining that the amount of power does not satisfy the second threshold. In other words, the transaction device may determine a first operation, configured to be performed by the first peripheral component, is to be performed, and may determine that a second operation, configured to be performed by the second peripheral component, is not to be performed. In some implementations, the first operation may be associated with a higher priority than the second operation. In some implementations, the transaction device may store information that indicates priorities of different operations, and this information may be configured on the transaction device (e.g., based on input received from a user device).

As shown by reference number 150, the transaction device (e.g., the power management component) may route power, received from the external device, to one or more peripheral components that are to perform the one or more operations. For example, the power management component may include one or more switches, transistors, and/or the like, which may be configurable to route power to different peripheral components of the transaction device, to connect or disconnect a peripheral component from a power supply (e.g., power supplied via the external device, the power reception component, and the power management component), and/or the like.

As an example, and as shown by reference number 160, the power management component may route power to a display of the transaction device, and the secure element may provide information, associated with the transaction, for presentation on the display. In some implementations, the information may be presented for a threshold amount of time, after which the display may be powered off and the power management component may stop routing power to the display, so as to conserve power.

As another example, and as shown by reference number 170, the power management component may route power to a WPAN antenna of the transaction device, and the secure element may provide information, associated with the transaction, for transmission by the WPAN antenna to a user device. As indicated above, the operations and peripheral components described in connection with FIG. 1 are provided as an example, and other examples are possible. In this way, the transaction device may be configured with additional functionality (e.g., beyond performing a transaction) without requiring an internal power source.

As indicated above, FIG. 1 is provided merely as an example. Other examples are possible and may differ from what was described with regard to FIG. 1.

Figure 2:
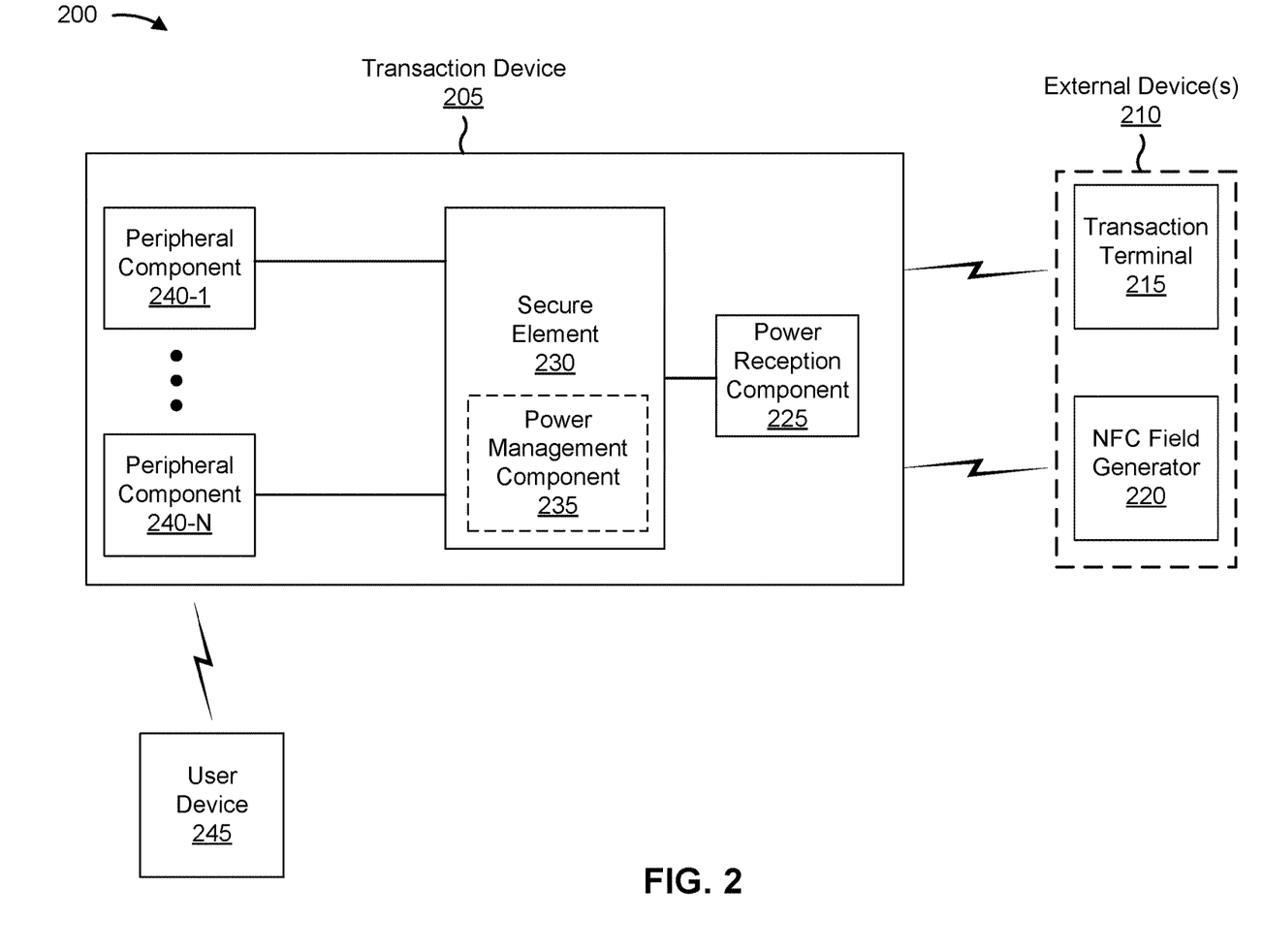
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a transaction device 205 and one or more external devices 210. As shown, the one or more external devices 210 may include a transaction terminal 215 and/or an NFC field generator 220. As further shown, the transaction device 205 may include a power reception component 225, a secure element 230, a power management component 235, and a set of peripheral components 240-1 through 240-N (N≥1) (hereinafter referred to individually as "peripheral component 240" and collectively as "peripheral components 240"). As further shown, environment 200 may include a user device 245. Devices and components of environment 200 may interconnect via wired connections, wireless connections, or a combination of wired and wireless connections.

Transaction device 205 includes one or more devices capable of receiving, generating, storing, processing, and/or providing secure information for performing a transaction and/or capable of performing one or more operations associated with the transaction. For example, transaction device 205 may include a transaction card (e.g., a smart card, a credit card, a debit card, a transit card, and/or the like), a mobile device (e.g., a tablet computer, a laptop computer, a smart wallet device, a phone, such as a mobile phone, a smart phone, a radiotelephone, and/or the like), a wearable device (e.g., a smart watch, smart eyeglasses, smart clothing, and/or the like), an Internet of Things (IoT) device, and/or the like. In some implementations, transaction device 205 may be capable of performing a contactless transaction (e.g., using NFC). A transaction performed by transaction device 205 may include a financial transaction (e.g., where money is exchanged), an access transaction (e.g., for accessing a secure area and/or system using a credential), a transit transaction (e.g., for accessing a transit system), a ticketing transaction (e.g., for obtaining a ticket), and/or the like.

External device 210 includes one or more devices capable of interacting with transaction device 205 to perform a transaction and/or capable of supplying power to transaction device 205. For example, external device 210 may include a transaction terminal 215, an NFC field generator 220, and/or the like. External device(s) 210 may be external from transaction device 205.

Transaction terminal 215 includes one or more devices capable of communicating with transaction device 205 to perform a transaction. For example, transaction terminal 215 may include a card reader (e.g., a magnetic stripe card reader, a chip card reader, and/or the like), a contact transaction terminal, a contactless transaction terminal, an NFC terminal (e.g., an NFC reader), a self-checkout station, a kiosk, a point-of-sale (POS) terminal, a security access terminal, an automated teller machine (ATM) terminal, a phone (e.g., a mobile phone, a smart phone, a radiotelephone, and/or the like), a desktop computer, a laptop computer, a tablet computer, and/or the like. Transaction terminal 215 may include one or more input components and/or output components to facilitate receiving and/or transmitting transaction information from and/or to transaction device 205. Example input components of transaction terminal 215 may include an NFC antenna, a number keypad, a touchscreen, a magnetic stripe reader, a chip reader, a camera, a scanner (e.g., a barcode scanner, QR code scanner, and/or the like), a radio frequency (RF) signal reader, and/or the like. Example output components of transaction terminal 215 may include a display device, a speaker, a printer, and/or the like. In some implementations, transaction terminal 215 may obtain secure information from transaction device 205, may read and/or authenticate the secure information (e.g., by interacting with one or more authentication devices, such as one or more servers), and may approve or deny a transaction based on reading and/or authenticating the secure information. In some implementations, transaction terminal 215 may interact with one or more other devices (e.g., a POS device, a door lock, a turnstile, an actuator, and/or the like) to complete the transaction.

NFC field generator 220 includes one or more devices, external from transaction device 205, capable of generating an NFC field. For example, NFC field generator 220 may include or be a component of a transaction terminal (e.g., transaction terminal 215), a user device (e.g., user device 245), a phone, a tablet computer, a laptop computer, a transaction card, a smart wallet, a wearable device, an Internet of Things (IoT) device, and/or the like. In some implementations, transaction device 205 may obtain power from an NFC field generated by NFC field generator 220, and may use the power to power secure element 230 to perform a transaction with transaction terminal 215. Additionally, or alternatively, transaction device 205 may use power from an NFC field generated by NFC field generator 220 to supply power to one or more peripherals components 240 to perform one or more operations associated with the transaction. In some implementations, NFC field generator 220 and transaction terminal 215 may be incorporated into the same device (e.g., a contactless transaction terminal, an NFC terminal, and/or the like). In some implementations, NFC field generator 220 and transaction terminal 215 may be separate devices. For example, transaction terminal 215 may be a magnetic stripe reader, a chip reader, and/or the like, and NFC field generator 220 may be a phone or some other separate device.

Power reception component 225 includes one or more devices capable of receiving power from external device 210. For example, power reception component 225 may include an antenna, such as an NFC antenna capable of transmitting and/or receiving information using an NFC protocol. For example, power reception component 225 may include a loop antenna (e.g., an NFC loop antenna), an inductor (e.g., an NFC inductor), and/or the like. In this case, power reception component 225 may receive power from external device 210 wirelessly and/or via a contactless communication. Additionally, or alternatively, power reception component 225 may receive power from external device 210 by contacting external device 210 (e.g., when placed in a chip reader and/or the like). In some implementations, power reception component 225 may be integrated into secure element 230 (e.g., may be part of the same integrated circuit).

Secure element 230 includes one or more devices capable of securely hosting an operating system and/or an application, and/or storing secure information. For example, secure element 230 may include a universal integrated circuit card (UICC), a secure digital (SD) card (e.g., a microSD card and/or the like), an embedded secure element, and/or the like. In some implementations, secure element 230 may include a tamper resistant hardware platform. In some implementations, secure element 230 may host a personalized card application and a cryptographic key required to perform a transaction (e.g., with transaction terminal 215). Additionally, or alternatively, secure element 230 may host a payment application or operating system (OS), such as JavaCard OS and/or the like. In some implementations, secure element 230 may store secure information, such as financial information (e.g., a card number, an account number, an expiration date, and/or the like), a credential (e.g., a username, a password, biometric information, a token, a certificate for signing documents, a user identifier, and/or the like), cryptographic information, account information, and/or the like. Additionally, or alternatively, secure element 230 may provide the secure information to transaction terminal 215 to perform a transaction. For example, secure element 230 may store financial information for performing a financial transaction, may store a credential for performing an access transaction, and/or the like. In some implementations, secure element 230 may include one or more processors for performing one or more processes described herein.

Power management component 235 includes one or more devices capable of routing power, received from external device 210 via power reception component 225, to one or more peripheral components 240. For example, power management component 235 may include a switch, a gate, a transistor, a controller, a processor (e.g., processor 320, described below in connection with FIG. 3), a programmable logic device (e.g., a complex programmable logic device (CPLD), a field-programmable gate array (FPGA), an embedded FPGA (eFPGA), and/or the like), an application-specific integrated circuit (ASIC), and/or the like. In some implementations, power management component 235 may include one or more diodes (e.g., an ideal diode), one or more switches (e.g., a load switch), and/or the like to control signals between power reception component 225 and one or more peripheral components 240 (e.g., to couple or decouple power reception component 225 and peripheral component(s) 240). In some implementations, power management component 235 may determine one or more operations to be performed in connection with a transaction, and may route power to one or more peripheral components 240 capable of performing the one or more operations. In some implementations, power management component 235 may include one or more processors for performing one or more processes described herein. In some implementations, power management component 235 is included in secure element 230. In some implementations, power management component 235 is separate from secure element 230.

Peripheral component 240 includes one or more devices capable of performing one or more operations associated with a transaction (e.g., between secure element 230 and transaction terminal 215). For example, peripheral component 240 may include a wireless personal area network (WPAN) communication component, a display, a speaker, a light-emitting diode, an energy storage component, and/or the like, as described elsewhere herein in connection with FIG. 1. Peripheral component 240 may receive power routed from power management component 235.

User device 245 includes one or more devices capable of receiving, generating, storing, processing, and/or providing information associated with a transaction. For example, user device 245 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, information may be provided to user device 245 via a peripheral component 240 of transaction device 205. The information may be presented on a display of user device 245, may be used to update an application executing on user device 245 (e.g., a virtual wallet and/or the like), may be transmitted by user device 245 to another device, and/or the like. Additionally, or alternatively, user device 245 may receive input from a user to configure transaction device 205, and such input may be transmitted by user device 245 to transaction device 205 to configure transaction device 205.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
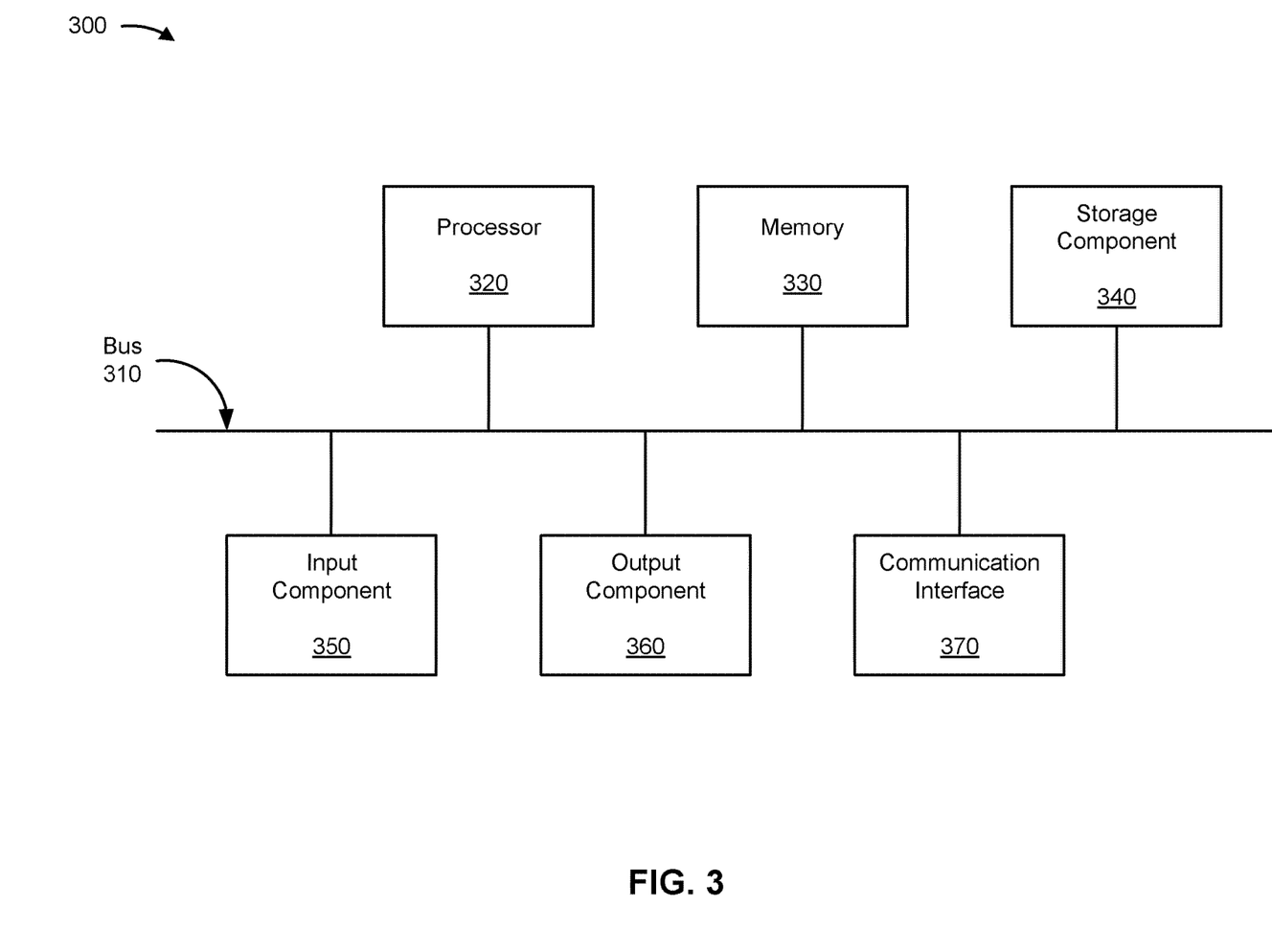
FIG. 3 is a diagram of example components of one or more devices of FIG. 2.

FIG. 3 is a diagram of example components of a device 300. Device 300 may correspond to transaction device 205, external device 210, transaction terminal 215, NFC field generator 220, power reception component 225, secure element 230, power management component 235, peripheral component 240, and/or user device 245. In some implementations, transaction device 205, external device 210, transaction terminal 215, NFC field generator 220, power reception component 225, secure element 230, power management component 235, peripheral component 240, and/or user device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), a tamper-resistant memory, and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
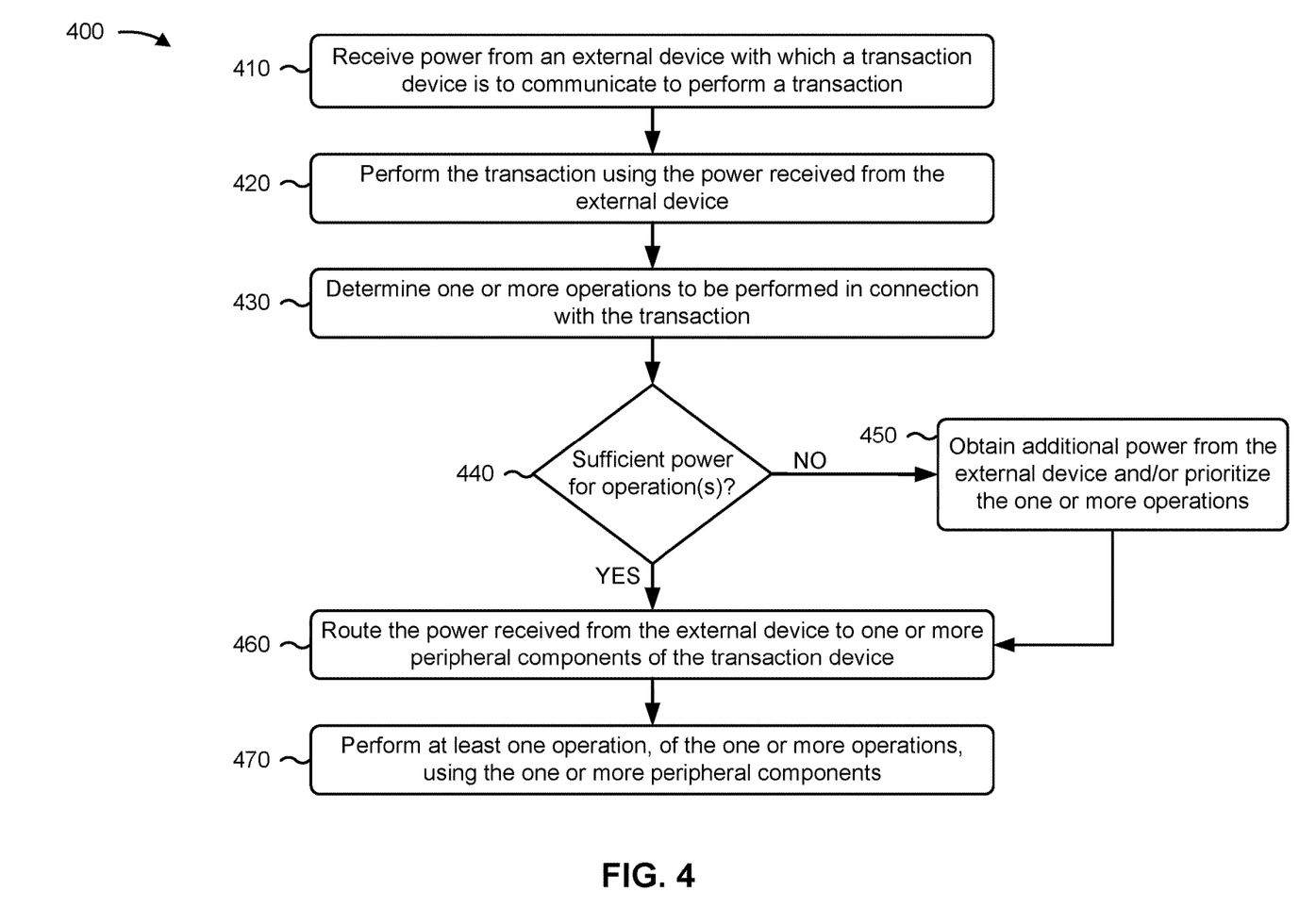
FIG. 4 is a flow chart of an example process for managing and routing power from an external power source.

FIG. 4 is a flow chart of an example process 400 for managing and routing power from an external power source. In some implementations, one or more process blocks of FIG. 4 may be performed by transaction device 205. In some implementations, one or more process blocks of FIG. 4 may be performed by another device or a group of devices separate from or including transaction device 205, such as an external device 210, transaction terminal 215, NFC field generator 220, power reception component 225, secure element 230, power management component 235, peripheral component 240, and/or user device 245.

As shown in FIG. 4, process 400 may include receiving power from an external device with which a transaction device 205 is to communicate to perform a transaction (block 410). For example, transaction device 205 may receive (e.g., using power reception component 225 and/or the like) power from an external device 210 with which transaction device 205 is to communicate to perform a transaction, as described above in connection with FIGS. 1-2.

As further shown in FIG. 4, process 400 may include performing the transaction using the power received from the external device (block 420). For example, transaction device 205 may perform (e.g., using secure element 230 and/or the like) the transaction using the power received from the external device 210, as described above in connection with FIGS. 1-2.

As further shown in FIG. 4, process 400 may include determining one or more operations to be performed in connection with the transaction (block 430). For example, transaction device 205 may determine (e.g., using secure element 230, power management component 235, and/or the like) one or more operations to be performed in connection with the transaction, as described above in connection with FIGS. 1-2. In some implementations, the one or more operations are different from the transaction.

As further shown in FIG. 4, process 400 may include determining whether there is sufficient power to perform the one or more operations (block 440). For example, transaction device 205 may determine (e.g., using secure element 230, power management component 235, and/or the like) whether there is sufficient power to perform the one or more operations, as described above in connection with FIGS. 1-2.

As further shown in FIG. 4, if transaction device 205 determines that there is not sufficient power to perform the one or more operations (block 440—NO), then process 400 may include obtaining additional power from the external device and/or prioritizing the one or more operations (block 450). For example, transaction device 205 may obtain (e.g., using power reception component 225 and/or the like) additional power from external device 210, as described above in connection with FIG. 1-2. Additionally, or alternatively, transaction device 205 may prioritize (e.g., using secure element 230, power management component 235, and/or the like) the one or more operations, as described above in connection with FIG. 1-2. Additionally, or alternatively, transaction device 205 may select a subset of the operations to be performed based on the prioritization. After obtaining additional power, prioritizing the one or more operations, and/or selecting a subset of the operations to be performed, transaction device 205 may route the power received from external device 210 to one or more peripheral components 240 of transaction device 205, as described below.

As further shown in FIG. 4, if transaction device 205 determines that there is sufficient power to perform the one or more operations (block 440—YES), or after transaction device 205 obtains additional power and/or prioritizes the one or more operations, then process 400 may include routing the power received from the external device to one or more peripheral components of the transaction device (block 460). For example, transaction device 205 may route (e.g., using power management component 235 and/or the like) the power received from external device 210 to one or more peripheral components 240 of transaction device 205, as described above in connection with FIGS. 1-2.

As further shown in FIG. 4, process 400 may include performing at least one operation, of the one or more operations, using the one or more peripheral components (block 470). For example, transaction device 205 may perform at least one operation, of the one or more operations, using one or more peripheral components 240, as described above in connection with FIGS. 1-2.

Process 400 may include additional aspects, such as any single aspect or any combination of aspects described below.

In some implementations, transaction device 205 may determine whether an amount of power available after performing the transaction satisfies a threshold, and may selectively obtain additional power from the external device, for performing the at least one operation, based on determining whether the amount of power satisfies the threshold. In some implementations, the additional power may be obtained when the amount of power does not satisfy the threshold, or the additional power may not be obtained when the amount of power satisfies the threshold.

In some implementations, transaction device 205 may determine an amount of power required to perform the one or more operations, and may obtain at least the amount of power required to perform the one or more operations. In some implementations, obtaining the additional power includes transmitting a request, to external device 210, for the additional power. In some implementations, the request indicates at least one of: an amount of the additional power required to be obtained to permit performance of the one or more operations, or an amount of time during which the additional power is to be obtained.

In some implementations, transaction device 205 may determine that an amount of power available after performing the transaction satisfies a first threshold but does not satisfy a second threshold, may route the power to a first peripheral component 240 based on determining that the amount of power satisfies the first threshold, and may prevent the power from being routed to a second peripheral component 240 based on determining that the amount of power does not satisfy the second threshold. In some implementations, the first peripheral component 240 is associated with a first operation associated with a higher priority than a second operation associated with the second peripheral component 240.

In some implementations, transaction device 205 may estimate, before completing the transaction, an amount of power required to perform the one or more operations, may estimate an amount of power that will be available after the transaction is completed, and may selectively obtain additional power from the external device 210 based on whether the amount of power that will be available after the transaction is completed satisfies the amount of power required to perform the one or more operations.

In some implementations, the one or more operations include at least one of: transmission or reception of information via a wireless personal area network (WPAN) communication component, presentation of information on a display, output of an indication via a speaker or a light-emitting diode, or storage of energy in an energy storage component.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein permit a transaction device 205 to appropriately route power, obtained from an external device 210, to peripheral components 240 that perform operations other than a transaction performed with the external device 210 (e.g., a financial transaction, an access transaction, and/or the like). Furthermore, some implementations described herein permit the transaction device 205 to obtain additional power from the external device 210 to power such operations. In this way, functionality of the transaction device 205 may be enhanced without requiring an internal power source and/or without the operations being performed using internal power stored by the transaction device 205.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A transaction device, comprising:
one or more memories; and
one or more processors coupled to the one or more memories and configured to:
  receive, from an external device and in connection with performing a transaction, a first amount of power;
  estimate, before completing the transaction and based on receiving the first amount of power, a second amount of power required to perform one or more operations to be performed other than the transaction, wherein the second amount of power is estimated before initiating the transaction or while performing the transaction; and
  obtain, from the external device and based on estimating the second amount of power, a third amount of power.

2. The transaction device of claim 1, wherein the second amount of power is estimated before initiating the transaction.

3. The transaction device of claim 1, wherein the second amount of power is estimated while performing the transaction.

4. The transaction device of claim 1, wherein the one or more processors are further configured to:
estimate, before completing the transaction and based on receiving the first amount of power, a fourth amount of power that will be available after the transaction is completed,
  wherein the third amount of power is further based on estimating the fourth amount of power.

5. The transaction device of claim 4, wherein the one or more processors are further configured to:
determine, based on estimating the second amount of power, that the fourth amount of power satisfies the second amount of power,
  wherein the third amount of power is obtained based on determining that the fourth amount of power satisfies the second amount of power.

6. The transaction device of claim 1, wherein the one or more operations are to be performed by one or more peripheral components of the transaction device.

7. The transaction device of claim 1, wherein the one or more processors are further configured to:
determine the one or more operations to be performed other than the transaction,
  wherein the second amount of power is estimated based on determining the one or more operations.

8. A method, comprising:
receiving, by a transaction device and from an external device, a first amount of power before or during performing a transaction;
estimating, by the transaction device, before completing the transaction and based on receiving the first amount of power, a second amount of power required to perform one or more operations to be performed other than the transaction, wherein the second amount of power is estimated before initiating the transaction or while performing the transaction; and
obtaining, from the external device and based on estimating the second amount of power, a third amount of power.

9. The method of claim 8, wherein the second amount of power is estimated while performing the transaction.

10. The method of claim 8, further comprising:
estimating, before completing the transaction and based on receiving the first amount of power, a fourth amount of power that will be available after the transaction is completed, wherein the third amount of power is further based on estimating the fourth amount of power.

11. The method of claim 10, further comprising:
determining, based on estimating the second amount of power, that the fourth amount of power satisfies the second amount of power,
wherein the third amount of power is obtained based on determining that the fourth amount of power satisfies the second amount of power.

12. The method of claim 8, wherein the one or more operations are to be performed by one or more peripheral components of the transaction device.

13. The method of claim 8, further comprising:
determining the one or more operations to be performed other than the transaction,
wherein the second amount of power is estimated based on determining the one or more operations.

14. A non-transitory computer-readable medium storing a set of instructions, the set of instructions comprising:
one or more instructions that, when executed by one or more processors of a transaction device, cause the transaction device to:
receive, from an external device and in connection with performing a transaction, a first amount of power;
estimate, before completing the transaction and based on receiving the first amount of power, a second amount of power required to perform one or more operations to be performed other than the transaction, wherein the second amount of power is estimated before initiating the transaction or while performing the transaction; and
obtain, from the external device and based on estimating the second amount of power, a third amount of power.

15. The non-transitory computer-readable medium of claim 14, wherein the second amount of power is estimated before initiating the transaction.

16. The non-transitory computer-readable medium of claim 14, wherein the second amount of power is estimated while performing the transaction.

17. The non-transitory computer-readable medium of claim 14, wherein the one or more instructions further cause the transaction device to:
estimate, before completing the transaction and based on receiving the first amount of power, a fourth amount of power that will be available after the transaction is completed,
wherein the third amount of power is further based on estimating the fourth amount of power.

18. The non-transitory computer-readable medium of claim 17, wherein the one or more instructions further cause the transaction device to:
determine, based on estimating the second amount of power, that the fourth amount of power satisfies the second amount of power,
wherein the third amount of power is obtained based on determining that the fourth amount of power satisfies the second amount of power.

19. The non-transitory computer-readable medium of claim 14, wherein the one or more operations are to be performed by one or more peripheral components of the transaction device.

20. The non-transitory computer-readable medium of claim 14, wherein the one or more instructions further cause the transaction device to:
determine the one or more operations to be performed other the transaction,
wherein the second amount of power is estimated based on determining the one or more operations.

* * * * *